(12) United States Patent
Mamidi et al.

(10) Patent No.: US 11,048,591 B1
(45) Date of Patent: Jun. 29, 2021

(54) EFFICIENT NAME SPACE ORGANIZATION IN A GLOBAL NAME SPACE CLUSTER

(71) Applicant: EMC IP Holding Company LLC, Hopkinton, MA (US)

(72) Inventors: Murthy Mamidi, San Jose, CA (US); George Mathew, Belmont, CA (US); Abhishek Rajimwale, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/590,589

(22) Filed: Oct. 2, 2019

(51) Int. Cl.
| | |
|---|---|
| *G06F 11/14* | (2006.01) |
| *G06F 12/02* | (2006.01) |
| *G06F 16/22* | (2019.01) |
| *G06F 3/06* | (2006.01) |
| *G06F 16/2455* | (2019.01) |

(52) U.S. Cl.
CPC .......... *G06F 11/1448* (2013.01); *G06F 3/067* (2013.01); *G06F 3/0608* (2013.01); *G06F 3/0631* (2013.01); *G06F 3/0644* (2013.01); *G06F 11/1458* (2013.01); *G06F 12/0253* (2013.01); *G06F 16/2246* (2019.01); *G06F 16/24556* (2019.01)

(58) Field of Classification Search
CPC ............. G06F 11/1448; G06F 11/1453; G06F 16/185; G06F 16/2246; G06F 11/1458; G06F 16/182; G06F 3/0608; G06F 3/0644; G06F 3/0659; H04L 41/044; H04L 41/12; H04L 45/04; H04L 41/04
See application file for complete search history.

(56) References Cited

U.S. PATENT DOCUMENTS

| | | | | |
|---|---|---|---|---|
| 8,880,726 | B2* | 11/2014 | McNamee | ............. H04L 41/12 709/238 |
| 9,613,046 | B1* | 4/2017 | Xu | ....................... G06F 11/2094 |
| 2006/0047836 | A1* | 3/2006 | Rao | ......................... H04L 67/14 709/229 |
| 2019/0205255 | A1* | 7/2019 | Hansen | ............... G06F 12/0891 |

* cited by examiner

*Primary Examiner* — Ernest Unelus
(74) *Attorney, Agent, or Firm* — Dergosits & Noah LLP; Todd A. Noah

(57) ABSTRACT

Described is a system for reclaiming unused storage space when distributing backup data to storage performance-based tiers within a clustered storage environment. The clustered storage environment may organize nodes into storage performance tiers, and each node within a tier may be tuned for a particular type of workload. Accordingly, the system implements a file system that provides the ability to reclaim unused storage space (e.g. perform garbage collection) for specific nodes or tiers independently despite implementing a global namespace. The global namespace may group (or co-locate) aspects of file information with the backup files. For example, file information may be stored on the same node that stores the associated backup files. Accordingly, the system may reclaim unused storage space for each node, or set of nodes forming a storage performance tier, independently and efficiently.

20 Claims, 7 Drawing Sheets

EFFICIENT NAME SPACE ORGANIZATION IN A GLOBAL NAME SPACE CLUSTER

TECHNICAL FIELD

This disclosure relates to managing deduplicated backup data, and more particularly, efficiently reclaiming unused storage space within a clustered storage environment.

BACKGROUND

Clustered storage systems employ various techniques for distributing data across a set of nodes of a cluster. For example, incoming data may be divided into chunks that are distributed across the set of nodes. When distributing data within a clustered storage system that employs data deduplication, certain types of data may be stored within various storage mechanisms. Despite the use of various storage mechanisms, external components such as a backup application may view or access backup files as if a single storage mechanism is employed. For example, the clustered storage system may use a file system that indexes all the files in a uniform manner irrespective of the underlying storage mechanism used to store the file. Accordingly, when performing maintenance operations associated with the backup files such as garbage collection, it may be necessary to traverse the entire file system. This may lead inefficiencies especially in situations when maintenance is required for only a subset of the backup files. Accordingly, there is a continued need to improve the efficiency of performing maintenance operations within a clustered storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
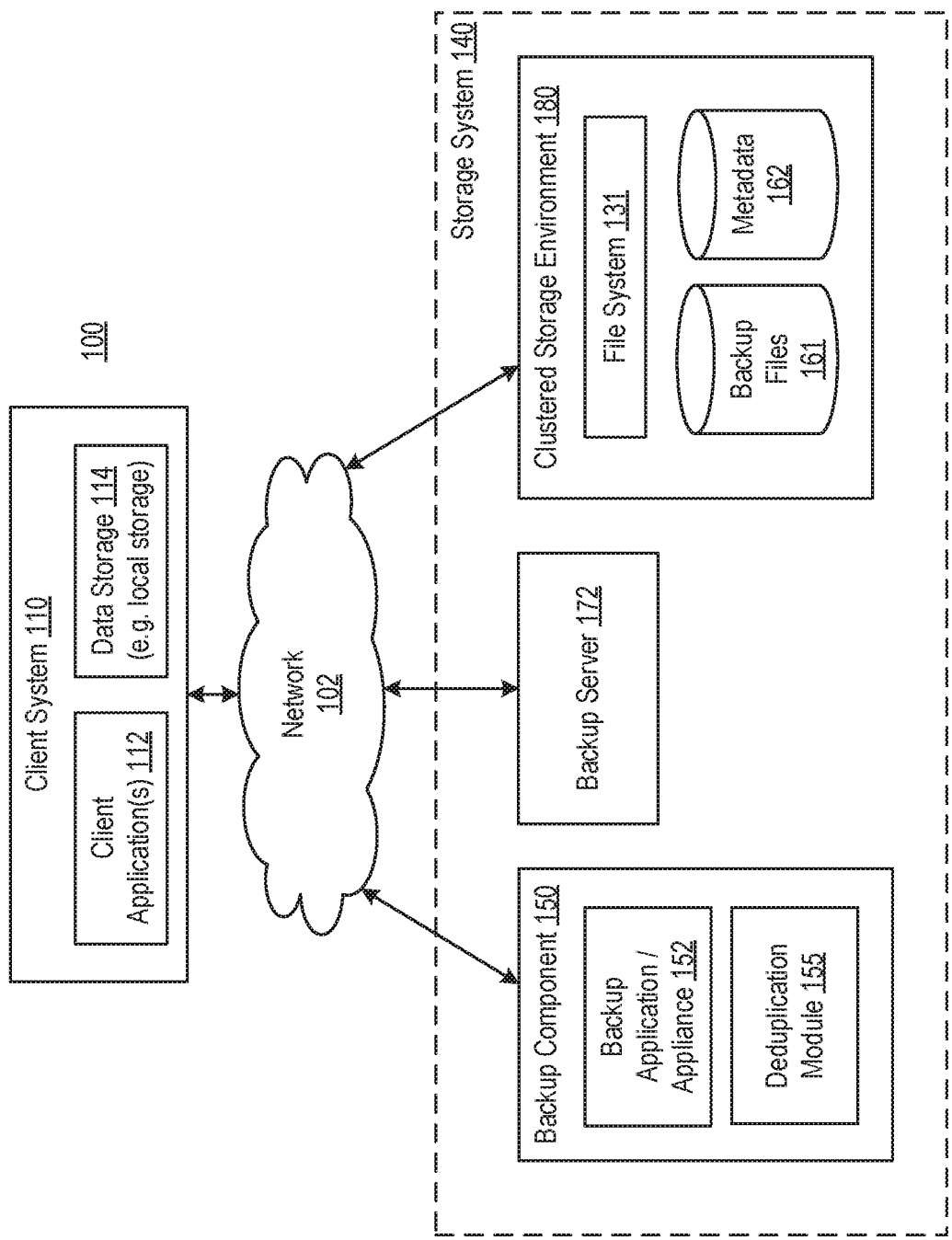
FIG. 1 is a block diagram illustrating an example operating environment for reclaiming unused storage space when distributing data to storage performance-based tiers of a clustered storage environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for reclaiming unused storage space when distributing backup data to storage performance-based tiers within a clustered storage environment. For example, the clustered storage environment may organize nodes into storage performance tiers, and each node within a tier may be tuned (or optimized) for a particular type of workload. Accordingly, the nodes of a particular tier may have certain storage performance-related characteristics such as read/write latency, deduplication processing efficiency, bandwidth, etc. As a result, the backup data may be redirected for storage to a node within the appropriate storage performance tier. Based on such a storage configuration, the system may implement a specialized file system that provides the ability to reclaim unused storage space (e.g. perform garbage collection) within the clustered storage environment (e.g. as part of a maintenance routine) in an efficient manner. For example, the file system may be implemented in a manner that provides the system with the ability to reclaim unused storage space for specific sets (or subsets) of backup files stored within the clustered storage environment. For example, a particular set of backup files may include those stored on a particular node, or a set of nodes that form a particular storage performance tier. Moreover, the system may reclaim the unused storage space for specific sets of backup files independently (e.g. in a standalone manner) despite implementing a global namespace to maintain file information (or file metadata) for all the backup files stored within the clustered storage environment.

In some configurations of a clustered storage environment, backup files may be distributed amongst a set of nodes while aspects of a namespace may be stored within different or specialized nodes. In such configurations, a process to reclaim unused storage space for a particular node would typically require accessing the different or specialized node in addition to the particular node, which creates additional access overhead and resource consumption. To overcome such inefficiencies, the system of some embodiments of the disclosure may store file information (or metadata) that may be part of a global namespace in a specialized (e.g. distributed) manner. For example, the system may store some of the file information on a specialized node (e.g. index node, metadata node) such as file names, attributes, permissions, etc., and also store aspects of the file information that are relied upon by processes to reclaim the unused storage space on the same node, or within the same storage performance tier, that stores the associated (or underlying) backup files. For example, the aspects of the file information relied upon by the processes to reclaim the unused storage space (e.g. garbage-collection-related file information) may include a storage allocation map (e.g. block allocation map) that indicates which portions of a storage (e.g. disk blocks) are currently in use (or used). Accordingly, such file information may be co-located such that it is stored on the same node that stores the underlying backup files. For example, each node may store a block allocation map for the backup files it stores rather than the specialized node storing a centralized block allocation map.

In addition, to further improve the efficiency of the system, file information (e.g. file names) for backup files stored within a particular storage performance tier may be stored on the same independent, or self-contained, component of the global namespace. In some embodiments, the global namespace may be implemented as a B+ tree, and the file information associated with a particular storage perform tier may be stored on the same branch (or set of intermediate or leaf nodes) of the B+ tree. Accordingly, the system may identify nodes of a particular storage performance tier by traversing only certain components of the global namespace.

Accordingly, the configuration of the system allows for the ability to reclaim unused storage space by nodes independently and in parallel, and without requiring access to additional nodes (e.g. specialized node) to determine whether certain portions of storage are in use. For example, a particular node (or nodes within a storage performance tier) may perform garbage collection independently without having to access the specialized node.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Data Domain data protection platform provided by Dell EMC™ Corporation, and associated systems, methods, and components, although use of this particular platform is provided only by way of illustration and is not required.

In some embodiments, the storage environment (or system) may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for reclaiming unused storage space when distributing data to storage performance-based tiers of a clustered storage environment according to one or more embodiments of the disclosure. As shown, the environment 100 may include a client system 110, and a storage (or target) system 140, which may include a backup system 150, backup server 172, and a clustered storage environment 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, storage system 140 may represent one or more components of a Data Domain Restorer (DDR)-based deduplication storage system, and the backup server 172 may be implemented in conjunction with a Data Domain deduplication storage server provided by Dell EMC for use with DDR storage devices. For example, the backup server 172 may be a standalone entity, or can be an element of the clustered storage environment 180. In some embodiments, the backup server 172 may be a Dell EMC Avamar server or a Dell EMC Networker server, although no particular server is required, and other backup and storage system configurations are contemplated.

The backup component 150, may include a backup application (and/or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage environment (e.g. as backup data 161). In some embodiments, the backup application 152 may cooperate with a backup client application of the client system 110 to back up client data to the clustered storage environment 180. A backup application 152 may also cooperate with a backup client application to restore backup data from the clustered storage environment 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage environment 180. However, in some embodiments, data deduplication may be performed partially, or entirely, within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage environment 180 (as further described herein) may store backup files 161 (or backup objects) within a one or more nodes (as further described herein). In general, the storage of backup files 161 may be configured to store client system 110 data backups that can be restored in the event of a loss of data. As shown, the clustered storage environment 180 may also store metadata 162 for (or associated with) the backup files 161. In some embodiments, the metadata 162 may include file information such as attributes, tags (e.g. tier identifier), storage location (e.g. storage/block address), etc. that is associated with the backup files 161. In addition, the clustered storage environment 180 may include and one or more instances of a filesystem 131 that catalogs backup files and other data residing in the clustered environment. In one embodiment, the filesystem 131 may be formed from, or include, a namespace for all the backup files (e.g. global namespace) stored within the clustered storage environment 180 (e.g. all backup files associated with a particular customer, client, account, etc.).

Figure 2:
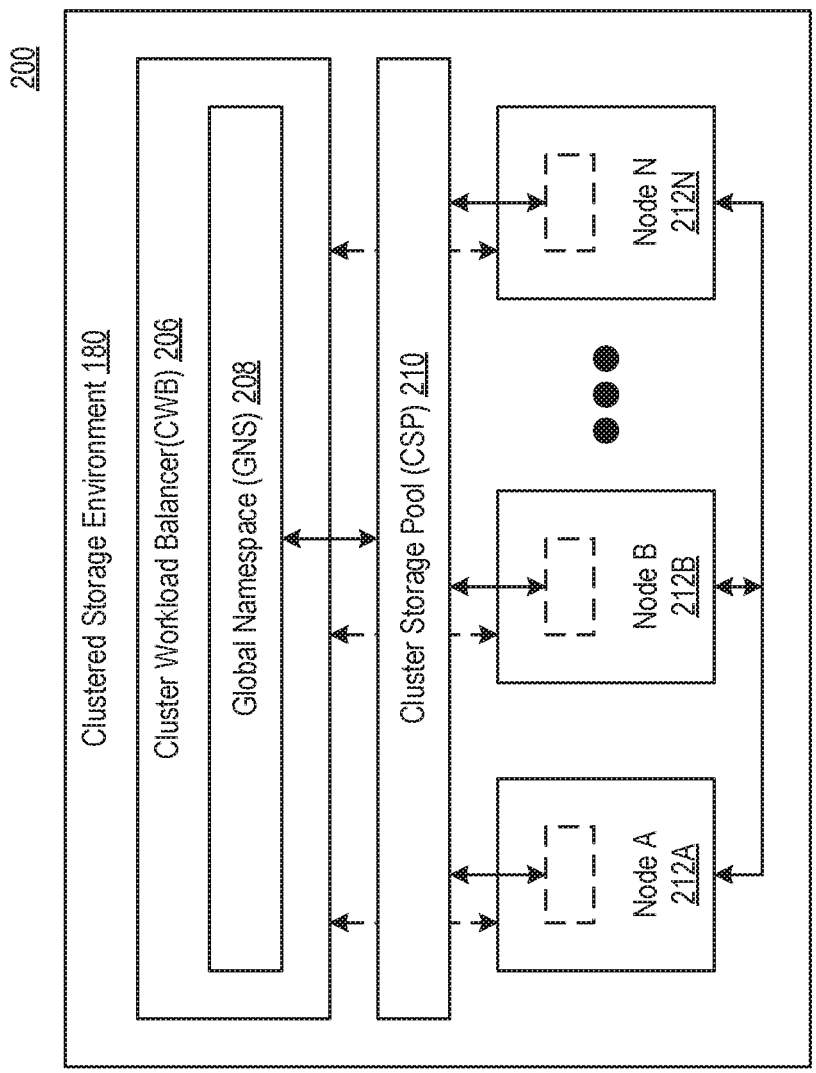
FIG. 2 is a block diagram illustrating an example clustered storage environment according to one or more embodiments of the disclosure.

FIG. 2 is a block diagram 200 illustrating an example clustered storage environment according to one or more embodiments of the disclosure.

The clustered storage environment (or system) 180 may represent a deduplicated cluster storage system (or service), distributed storage system (or service), distributed file system (or service), etc. As shown, the clustered storage environment 180 may include, or represent, a group of linked nodes (or storage nodes) 212A-N, which may be configured to share resources. The shared resources may include computing resources (e.g. computer processors and memory), storage resources (e.g. persistent data storage), and network resources (e.g. traffic bandwidth). Further, the sharing of any resource may entail virtualizing the resource in each node to create a logical pool of that resource that spans, and is made available to all nodes (e.g. nodes 212A-N), across the clustered storage environment 180. For example, when considering storage resources, the physical device (e.g. HDDs, SSDs, etc.) representative of the local storage resources on each node may be virtualized to form a globally-accessible cluster storage pool (CPS) 210. Accordingly, the CPS 210 may represent a logical pool of disk capacity formed from all storage resources across the clustered storage environment 180.

In some embodiments, a node 212 may represent a physical computing system dedicated to storing backup files, processing workloads, and other operations. For example, processing workloads may include processing service requests submitted to the clustered storage environment 180 such as receiving file operation requests delegated from the cluster workload balancer (CWB) 206, processing the file operation requests (e.g. directing/redirecting backup data, and/or storing backup data as further described herein), and returning file operation responses back to the CWB 206 based on results obtained from processing the file operation requests. It should be noted that a node 212 may perform other functionalities without departing embodiments of the disclosure.

In some embodiments, the clustered storage environment 180 may include a cluster workload balancer (CWB) 206. The CWB 206 may represent a physical computing system dedicated to distributing service traffic across the various nodes of the clustered storage environment 180. This distribution of service traffic (also referred as load balancing)

may reduce individual node 212 workload, may prevent any one node from becoming a single point of failure, and may improve the responsiveness and availability of the deduplicated storage service provided by the clustered storage environment 180. To the extent of load balancing, the CWB 206 may include the following functionalities: monitoring and tracking resource availability, for any given point in time, across the various nodes, receiving file operation requests from the upstream components (e.g. backup component 150, backup server 172, etc.); selecting the best available nodes to process the file operation requests based on the tracked resource availability; delegating the file operation requests to the best available nodes for processing; receiving file operation responses from the best available nodes; and forwarding the file operation responses to the requesting components.

In some embodiments, the CWB 206 may also represent a single point of contact, for the clustered storage environment 180, with which components (e.g. of environment 100) may interface. In some embodiments, the clustered storage environment 180 may maintain a global namespace (GNS) 108, which may be managed by the CWB 206. The GNS 208 may refer to an abstraction that unifies the various local filesystems, maintained by the various nodes 212A-N across the clustered storage environment 180, into a single virtualized global filesystem. The single virtualized global filesystem may subsequently be presented to the components in order to simplify the management and accessibility of storage and/or data across the clustered storage environment 180, which may be aggregated in the form of the CPS 210.

Figure 3:
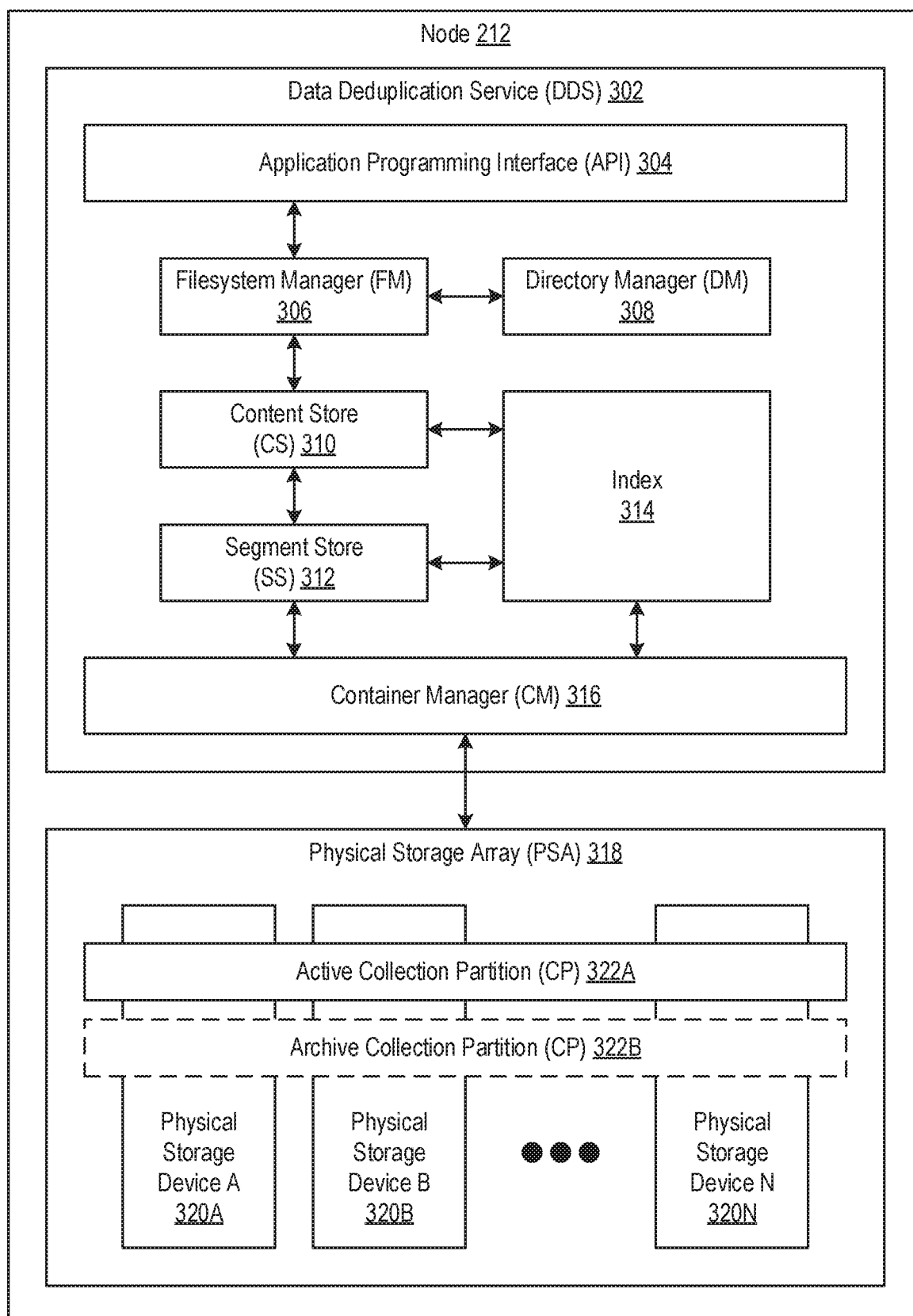
FIG. 3 is a block diagram illustrating an example node according to one or more embodiments of the disclosure.

FIG. 3 is a block diagram 300 illustrating an example node according to one or more embodiments of the disclosure. As shown a node 212 may include a data deduplication service (DDS) 302 operatively connected to a physical storage array (PSA) 318.

In some embodiments, the DDS 302 may represent a component that may be responsible for consolidating and/or retrieving data (e.g. backup files from the PSA 318). In some embodiments, the DDS 302 may perform such responsibilities while performing data deduplication. In some embodiments, the DDS 302 may include an application programming interface (API) 304, a filesystem manager (FM) 306, a directory manager (DM) 308, and a content store (CS) 310, a segment store (SS) 312, an index 314, and a container manager (CM) 316. Each of these DDS 302 subcomponents is described below.

The API 304 may represent an interface through which external entities such as the cluster workload balancer (CWB) 206 and other nodes 212 in a cluster may interact with the DDS 302. Accordingly, the API 304 may employ a set of subroutine definitions, protocols, and/or tools directed to enabling communications between the DDS 302 and the external entities. For example, the API 304 may performing functionalities including: receiving file operation requests delegated from the CWB 206; extracting file operations and operation-pertinent arguments (OPA) from the file operation requests; invoking the FM 306 using the file operations and the OPA, to process the file operation requests; receive remote procedure calls (RPC) from the FM 306 for transmission to one or more specified other nodes; receive remote procedure reports (RPR) from other nodes in response to RPC transmitted beforehand; invoking the FM 306 using the RPR; receiving file operation responses from the FM 306; and transmitting the file operation responses, disclosing results (if any) concerning earlier delegated file operation requests, to the CWB. It should be noted that additional functionalities are also contemplated.

The FM 306 may represent a component responsible for the coordination of DDS 302 operations. To that extent, the FM 306 may include functionality to: receive file operations delegated to the node 212 for processing; invoke other DDS 302 subcomponents (e.g. the DM 308 and the CS 310) towards processing received file operations; issue remote procedure calls (RPC) to other (remote) nodes; and issue file operation reports based on results yielded from processing received file operations. In addition, the FM 306 may include functionality to maintain, lookup, and update a local redirection cache. In one embodiment, the FM 306 may include functionality to indicate which file segments (e.g. unique blocks or chunks of data) pertain to a file. These file segments may be identified as a list of fingerprints (or hashes) representative of the file segments. In some embodiments, the FM 306 may access an storage allocation map stored by the node 212 to determine which portions of storage are currently in use as part of a garbage collection process.

The DM 308 may represent a component responsible for the management of files in one or more filesystems across the clustered storage environment 180. To that extent, the DM 308 may include functionality to maintain, traverse, and update one or more namespace trees. For example, a namespace tree may represent a hierarchical data structure directed to reflecting the way files and/or directories may be identified and stored in data storage (e.g. the PSA 318).

The CS 310 may represent a component responsible for the management of file content associated with various files consolidated in the PSA 318. To that extent, the CS 310 may include functionality to maintain, traverse, and update various segment trees. For example, a segment tree may refer to a Merkel tree, or a hierarchical data structure, for identifying and tracking the locations of file segments, pertinent to a single file, stored in the physical storage devices (320A-N) of the PSA 318. If the PSA 318 is formed from one physical storage device (320A-N), the locations of the pertinent file segments may be indicated through disk offsets. Alternatively, if the PSA 318 is formed from multiple physical storage devices (320A-N), the locations of the pertinent file segments may be indicated through physical storage device (320A-ON) identifiers in addition to disk offsets. Furthermore, the CS 310 may also include functionality to, at least in part, execute data deduplication on the node 212 by deconstructing files into file segments (also referred to as blocks or chunks).

The SS 312 may represent a component responsible for assessing whether new file segments, yielded from the CS 310, may already be stored. Should new file segments be stored already, metadata for those new file segments, rather than the new file segments themselves, may be stored to optimize storage space utilization. In conjunction with the CS 310, the SS 312 may include functionality to execute data deduplication operations on the node 212.

The index 314 may represent a data structure that may be used to locate stored file segments within one or more physical storage devices (320A-N) of the node 212. More specifically, the index 314 may include associations that map fingerprints (or hashes) to storage locations that consolidate the file segments that which the fingerprints represent. In some embodiments, the index 314 may also store a storage allocation map as further described herein.

The CM 316 may represent a component responsible for the management and tracking of containers. A container may refer to a logical grouping of compression regions consolidated in data storage (e.g. PSA 318). Each compression region, in turn, may encompass a compressed and/or archived data object that stores one or more file segments and their associated metadata within.

Returning to the node 212 components, in some embodiments, the PSA 318 may represent a collection of one or more physical storage devices (320A-N) on which various forms of information (e.g. backup files) may be stored and/or consolidated. Examples of a physical storage device (320A-N) may include, but are not limited to, a hard disk drive (HDD), a solid state drive (SSD), and network attached storage (NAS), etc. An active collection partition (CP) 322A may be implemented and span across at least a subset of the physical storage devices (320A-N) of the PSA 318. Accordingly, the active CP 322A may represent a logical storage pool wherein a collection of files stored therein dedupes only with other files in the logical storage pool. In some embodiments, an archive CP 322B may also be implemented and span across at least another subset of the physical storage devices (320A-N). In contrast to the active CP 322A, which may store frequently accessed and/or recently created files, the archive CP 322B may represent a logical storage pool wherein aged, seldom accessed files may reside and dedupe with other aged, seldom accessed files.

Figure 4:
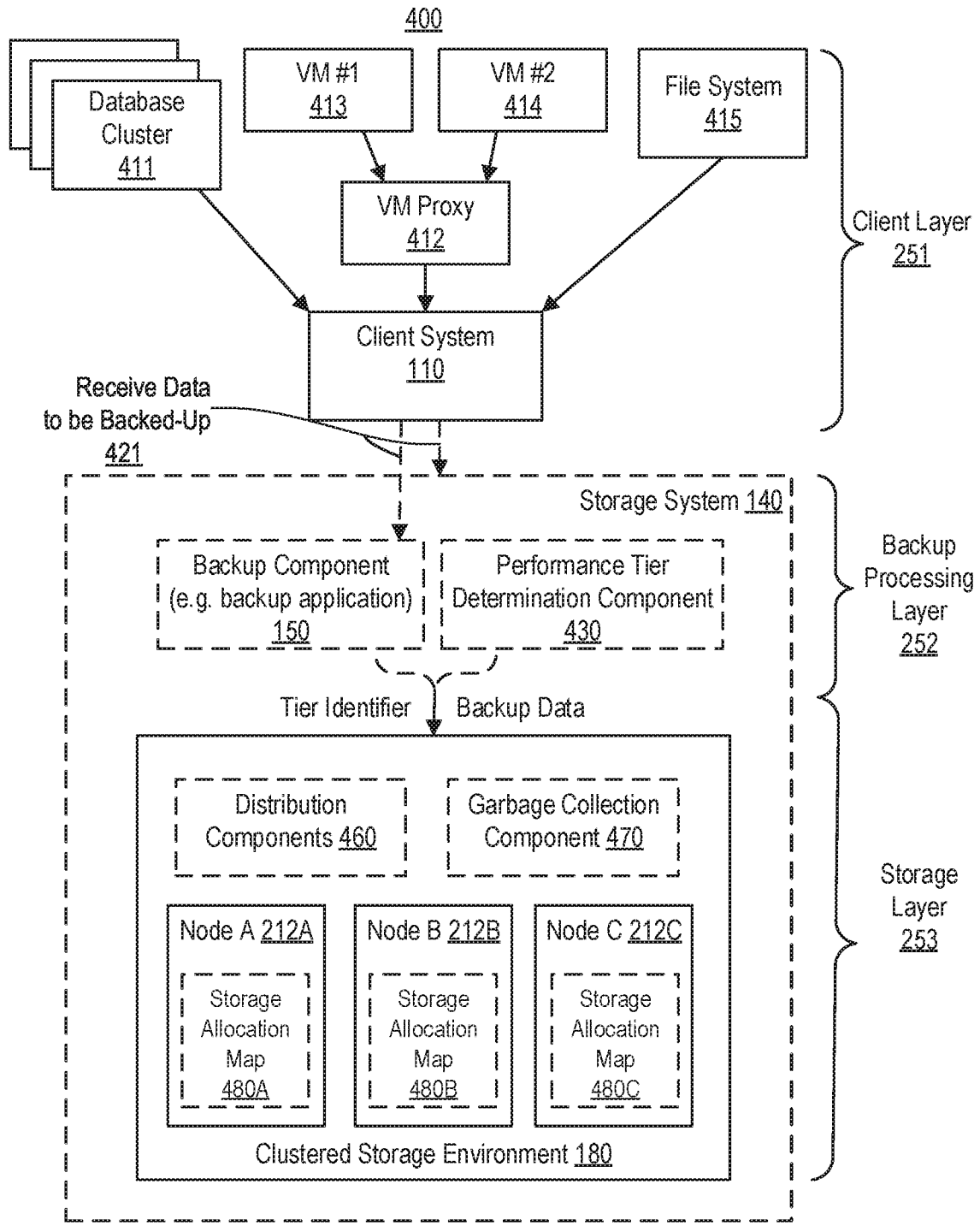
FIG. 4 is a block diagram illustrating an example interaction between components for reclaiming unused storage space within a clustered storage environment according to one or more embodiments of the disclosure.

FIG. 4 is a block diagram 400 illustrating an example interaction between components for reclaiming unused storage space within a clustered storage environment according to one or more embodiments of the disclosure. As shown, a client system (or client server) 110 may be associated with one or more data sources (e.g. data sources 411-415). The data sources may be part of, or work in conjunction with, the client system 110. For example, the data sources may be part of a separate server, or part of a cloud storage infrastructure. Accordingly, the client system 110 and the data sources may be part of a client layer 251 that provides backup data (e.g. data to be backed-up) to a storage system 140 as shown in 421. The client system 110 may provide (or transmit, send, transfer, forward, etc.) the data to the storage system 140 as part of a backup process to initiate the creation of one or more backup files stored within the storage system 140. In some embodiments, the data may be sent to the storage system 140 at various time points as part of a backup schedule (e.g. hourly, daily, etc.).

The backup component 150 and the performance tier determination component 430 may be part of a backup processing layer 252. In some embodiments, the performance tier determination component 430 may be part of a backup application (e.g. backup application 152). The performance tier determination component 430 may analyze the received backup data and determine an initial storage performance tier to which the backup data may be stored. For example, backup data may be assigned to a performance tier based on attributes associated with the backup data. The attributes associated with the backup data may include type of data, access frequency, storage duration, deduplication ratio, and any other information that may determine or predict a workload associated with such backup data. The storage performance tiers may be formed from a set of nodes that have (or are tuned for) various storage performance characteristics as further described herein.

As shown, the clustered storage environment 180 may receive backup data along with an associated tier identifier (or storage performance tier identifier) such as a tier placement tag. In some embodiments, the backup component 150 may provide (e.g. transmit, send, transfer, inject, input, etc.) the storage performance tier identifier to the clustered storage environment 180. The storage performance tier identifier may be received at the same time as the backup data (e.g. as part of the data, or as an input to an operation), or at a different time from when the backup data is received by the clustered storage environment 180.

As shown, the clustered storage system 180 may include the storage nodes 212 (e.g. storage nodes 212A-C), and related components that may form a storage layer 253. In some embodiments, distribution components 460 may redirect the backup data to a node of the appropriate storage tier based on the particular storage performance tier identifier. The distribution components 460 may work in conjunction with, or be a part of, nodes 212. For example, the distribution components 460 may be part of a component stack (e.g. software stack) that may include one or more of the cluster workload balancer (CWB) 206, filesystem manager 306, API 304, etc. In one embodiment, the distribution components 460 may include an API or plug-in, that acts as a layer that the backup component 150 (e.g. via a backup application 152) may access to perform operations as described herein with components of the clustered storage environment 180.

The clustered storage system 180 may receive the tier identifier in various ways. In some embodiments, the tier identifier may be received as an input to an operation that writes (or creates) a backup file to the clustered storage environment 180. For example, the input may include the tier identifier as an argument to an operation (e.g. function, method, class, etc.) that initiates the creation of a backup file to the clustered storage environment 180. In some embodiments, the backup component 150 may initiate creation of a backup file using an API provided by the clustered storage environment 180. For example, the clustered storage environment 180 (e.g. as part of DDS 302) may provide an API (e.g. API 304) to access a storage layer (or protocol) to which the tier identifier may be passed along with the backup data (or portion thereof) to be used to create a backup file. In some embodiments, the tier identifier may be received directly to a filesystem or namespace managed by the clustered storage environment 180. For example, the backup component 150 may provide the tier identifier by setting (or specifying) the identifier as a file attribute for file information associated with the backup file. In some embodiments, the backup component 150 may provide the tier identifier by specifying the identifier as part of metadata (e.g. metadata attribute, metadata file, index, database, etc.) associated with a backup file. Such metadata may be stored as file information that is stored as part of, or associated with (e.g. referenced), by a global namespace as further described herein. In addition, in some embodiments, the global namespace may be stored on a specialized node (e.g. index node) that may be referenced when performing file operations (e.g. reading/writing backup files). For example, the index node may include a separate (or independent) specialized node that is provided to primarily (or exclusively) store index information instead of backup data or files as with other nodes.

In some embodiments, the tier identifier (or tier placement tag) may also be provided as part of a set of tags. For example, the tier placement tag may be provided along with a node placement tag (e.g. data source identifier). The node placement tag may allow the system to store the backup data to a node that already stores related data (e.g. previous generations of the backup data). To create a node placement tag, the backup component 150 may obtain data source information associated with the received data from the client system 110. The data source information may include any form of information that may be used (directly or indirectly) to create an identifier (or unique identifier) for a data source.

For example, the data source identifier may include a device (or host) address (e.g. IP, network, or MAC address, etc.), an identifier (e.g. VM ID, database ID, storage ID, etc.), or other form of identifier (e.g. device name, customer ID, client ID, etc.). For example, the data to be backed-up (e.g. application data, operating system data, database records or objects, etc.) may originate from one than one VM (e.g. VMs 413 and 414) via a VM Proxy 412, and therefore, the data source identifier may include the particular VM ID (e.g. VM ID for VMs 413 or 414) instead of the VM ID for VM Proxy 412. As another example, as shown Cluster Database 411 may include several databases (or databases instances), and accordingly, the data source identifier may be a database ID for a particular database or instance within the cluster. Thus, in some embodiments, a tier placement tag and a node placement tag may be provided together to allow the clustered storage environment 180 to store related data together on the same node and within an appropriate storage performance tier.

As described, the storage system 140 may perform various maintenance operations as part of managing the stored backup files. For example, the storage system 140 may include a garbage collection component (or garbage collector) 470 that may reclaim (or attempt to reclaim) storage space occupied by files (or objects) that are no longer in use by the storage system 140. For example, the garbage collection component 470 may reclaim the storage space allocated to one or more unused data segments. In some embodiments, the garbage collection component 470 may reclaim unused storage space for subsets of the stored backup files such as those associated with a particular node or a storage performance tier. For example, the garbage collection component 470 may initiate garbage collection for one or more nodes 212. In some embodiments, a node 212 may perform garbage collection independently in response to receiving an instruction from the garbage collection component 470. As shown, each node 212A-C may store a corresponding storage allocation map 480A-C. The storage (or block, data, segment, file, etc.) allocation map 480 may indicate which portions of a storage (e.g. disk blocks) are currently in use (or used). For example, disk blocks that are currently not in use (e.g. previously deleted) may be cleared as part of the garbage collection process.

Figure 5:
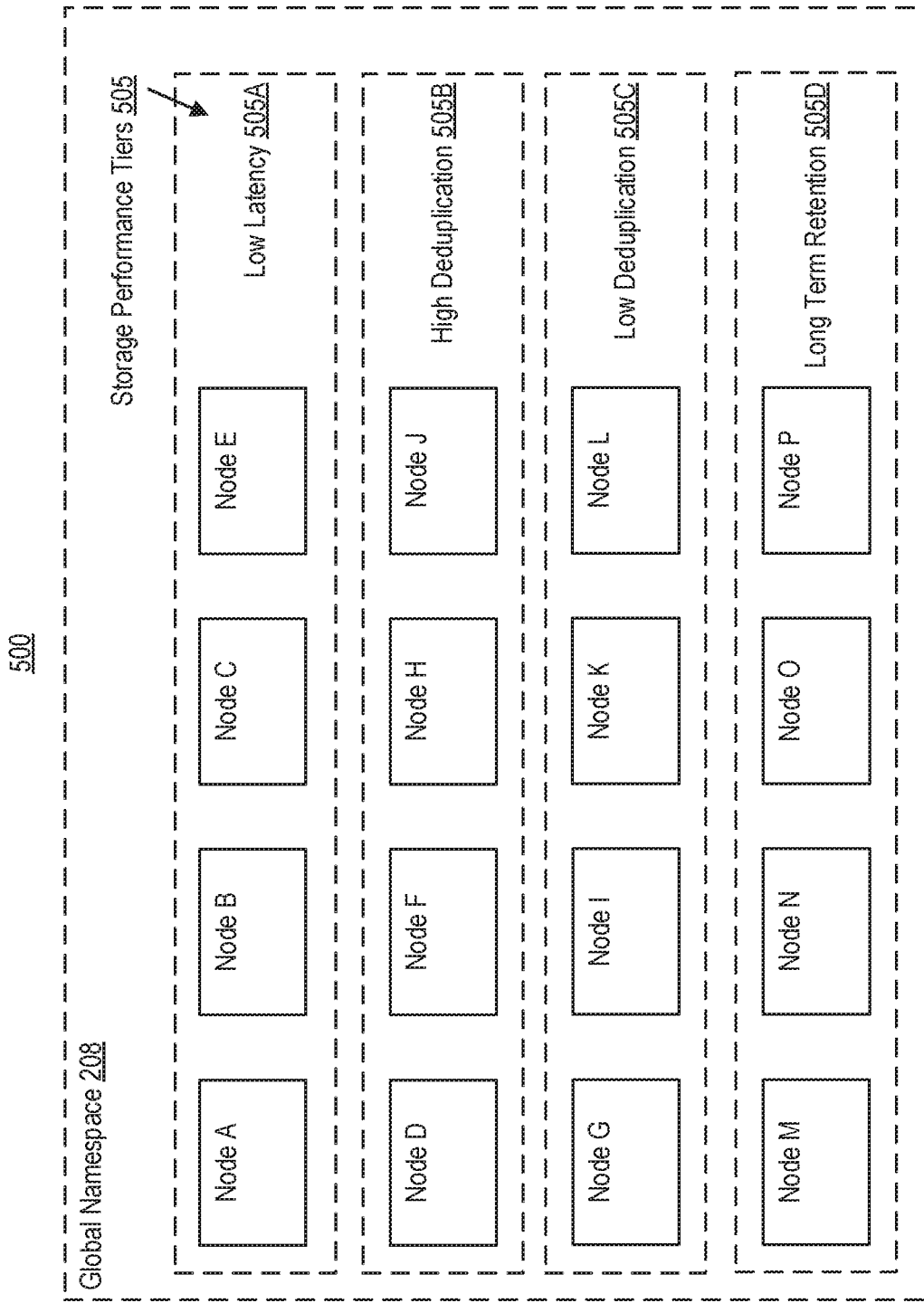
FIG. 5 is a block diagram illustrating an example set of nodes organized into a set of storage performance tiers according to one or more embodiments of the disclosure.

FIG. 5 is a block diagram 500 illustrating an example set of nodes organized into a set of storage performance tiers according to one or more embodiments of the disclosure. Accordingly, shown is a representation of a set of nodes (e.g. nodes 212) including Nodes A-P that are organized into a set of storage performance tiers (or classes, categories, etc.) 505. In this example, the tiers may include a low latency storage performance tier 505A, a high deduplication storage performance tier 505B, a low deduplication storage performance tier 505C, and a long term retention storage performance tier 505D. Accordingly, each of the nodes within a particular storage tier 505 may be tuned (or customized, specialized, optimized, etc.) in a manner corresponding to the storage performance tier 505. For example, the capabilities of the physical components (e.g. physical storage devices 320) underlying the nodes of the tier may be associated with certain storage-related characteristics (or proprieties, attributes etc.). By way of example, nodes within the low latency storage performance 505A, may be associated with solid-state drive (SSD) storage components, tuned for a larger data and/or metadata cache, and configured to work with a fixed data segment size. As another example, nodes within the high deduplication storage performance tier 505B, may be associated with hard disk drive (HDD) storage components, turned for larger compression, and configured to work with a variable data segment size. Nodes within the long term retention storage performance tier 505D, may be associated with cloud-based storage components (or services), may be tuned to store a smaller amount of deduplication-related metadata, and configured to store backup data as cloud-based storage objects.

As another example, the storage performance tiers may include one or more tiers that are associated with storing backup files for deduplicated data, and one or more tier that are associated with storage backup file for non-deduplicated data. For example, a storage performance tier storing deduplicated data may be tuned to perform deduplication, and therefore, may include a certain amount of deduplication-related metadata, or other components (e.g. cache memory) to aid in the deduplication processing. In contrast, a storage performance tier storing non-deduplicated data may not be concerned with performing deduplication processing, and therefore, may be tuned to store the backup files directly (e.g. as is).

It should be noted that the storage performance tiers shown are just examples, and additional types of storage tiers, nomenclature, or categorization is contemplated. However, in general, the system provides an efficient mechanism to categorize nodes in various categories (or tiers) based on the storage performance (or characteristics, properties, attributes, etc.) provided by the nodes and/or the underlying physical storage devices associated with the nodes.

As shown, the organization of the set of nodes into storage performance tiers may be stored as part of the global namespace 208. Accordingly, the global namespace 208 may be used as, or part of, a file system that stores file information for backup files stored by the nodes within the storage performance tiers 505. The global namespace 208 may represent a hierarchical data structure dedicated to indexing and tracking backup files across the set of nodes. For example, the global namespace 208 may be an abstraction using linked namespace trees to represent the distribution of backup files stored by the set of nodes, although other data structures are contemplated. In some embodiments, the global namespace 208 may be represented as a B+ tree data structure.

As described, in some embodiments, the clustered storage environment may implement a structure for the global namespace 208 that allows for file information for backup files to be independently associated with particular nodes or storage performance tiers. In some embodiments, a tier identifier (or tier placement tag, storage performance tier identifier, etc.) may be stored as part of the file information maintained by the clustered storage system. For example, the tier identifier may be stored as part of the file information that is stored within, or associated, with the global namespace 208. In some embodiments, the file information for backup files stored within the nodes of a particular storage performance tier may be stored as an independent component of a global namespace.

In some embodiments, portions of the file information associated with the global namespace 208 may be distributed throughout the nodes. For example, in some embodiments, portions of the file information and/or global namespace 208 may be stored on a specialized node such as an index node or metadata node. For example, file information of the global namespace 208 stored on the specialized node may include information such as file names, attributes, permissions, etc. In addition, aspects of the file information that are relied upon by processes to reclaim the unused storage space (e.g. garbage-collection-related file information) may be stored on the individual nodes themselves. For example, each node may store and maintain a corresponding storage allocation map for backup files stored by the node. Accordingly, each node may independently perform garbage collection by determining which portions of storage associated with the node are in use without having to access the specialized node.

In some embodiments, the global namespace may be represented as a B+ tree data structure, and the independent component of the global namespace may include a branch, a set of intermediate nodes, or a set of leaf nodes, of the B+ tree. Accordingly, file information associated with a particular storage performance tier, may be a self-contained or standalone unit of the namespace. As a result, the clustered storage environment may obtain portions of the file information for particular storage performance tiers without having to traverse the file information associated backup files within other storage performance tiers. In addition, updates to information associated with a particular backup file (e.g. attributes identifying an associated node and/or storage performance tier) may be updated without affecting entries of the namespace tree for other backup files. Accordingly, a backup file may be distributed or redistributed amongst the tiers independently within the namespace.

Figure 6:
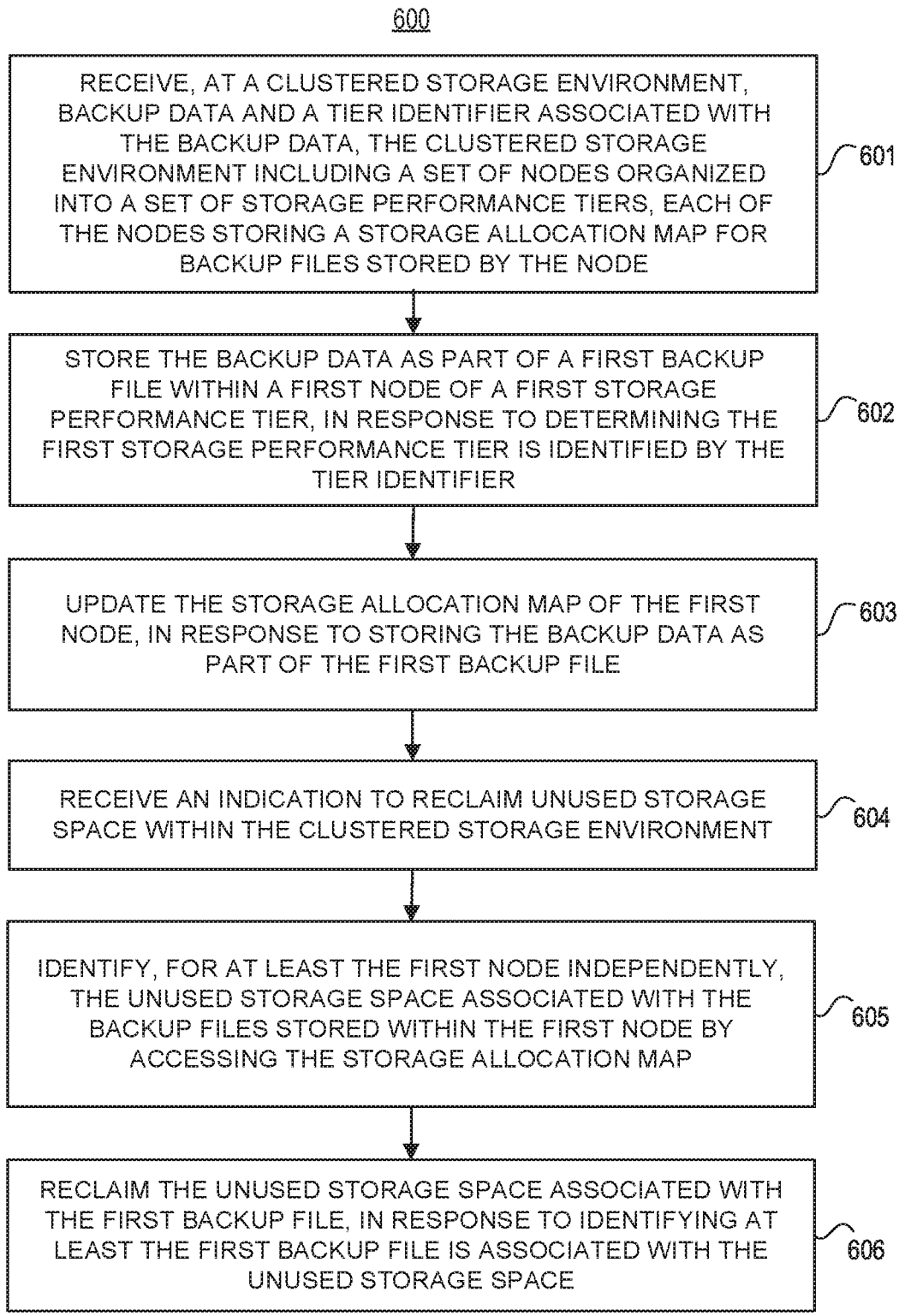
FIG. 6 is a flow diagram illustrating an example method of reclaiming unused storage space for a particular storage performance tier within a clustered storage environment according to one or more embodiments of the disclosure.

FIG. 6 is a flow diagram illustrating an example method of reclaiming unused storage space for a particular storage performance tier within a clustered storage environment according to one or more embodiments of the disclosure. Process 600 may use processing logic, which may include software, hardware, or a combination thereof. For example, process 600 may be performed by a system including one or more components described in operating environment 100 (e.g. storage system 140, clustered storage environment 180, node 212, etc.).

In 601, the system (e.g. storage system 140) may receive, at a clustered storage environment (e.g. clustered storage environment 180), backup data (data from data storage 114) and a tier identifier associated with the backup data. As described, the clustered storage environment may include, or be formed from, a set of nodes (e.g. nodes 212) organized into a set of storage performance tiers (e.g. storage performance tiers 505). In some embodiments, each of the nodes may store a storage allocation map (e.g. storage allocation map 480) for backup files stored by the node.

In addition, the clustered storage environment may include a file system (e.g. file system 131) that stores (or accesses) portions of the file information for backup files (e.g. backup files 162) stored within the nodes of each storage performance tier as an independent component of a global namespace (e.g. global namespace 208). For example, the global namespace may be represented as a B+ tree data structure. Accordingly, in some embodiments, the independent component of the global namespace may include a branch, a set of intermediate nodes, or a set of leaf nodes, of the B+ tree. In some embodiments, the set of intermediate or leaf nodes may be within a predetermined proximity within the namespace tree. In some embodiments, a specialized index node may store the global namespace. Accordingly, the file information may be obtained by the system by accessing the specialized index node. For example, file information of the global namespace stored on the specialized node may include information such as file names, attributes, permissions, etc.

As described, the system may distribute the backup data to a particular storage performance tier based on an analysis of the backup data. For example, the backup data may be associated with a tier identifier that is provided to the clustered storage environment, for example, as part of a backup process. Accordingly, in 602, the system may store the backup data within a first storage performance tier. For example, the system may store the backup data as part of a first backup file within a first node of the first performance tier. In some embodiments, the system may store the backup data within the first storage performance tier in response to determining the first storage performance tier is identified by the tier identifier.

As described, in some embodiments, the set of storage performance tiers may include at least a storage performance tier storing deduplicated data, and a storage performance tier storing non-deduplicated data. For example, backup data associated with a tier identifier for the deduplicated storage performance tier may be redirected to a high deduplication storage performance tier (e.g. storage performance tier 505B). In contrast, backup data associated with a tier identifier for the non-deduplicated storage performance tier may be directly stored to particular storage performance tier without undergoing deduplication processing. Accordingly, the system may conserve resources based on the use of a tier identifier.

When storing backup data as part of a backup file, the backup file may be updated or newly created. In addition, the storage allocation map may be correspondingly updated. Accordingly, in 603, the system may update the storage allocation map of the first node, in response to storing the backup data as part of the first backup file. In addition, the file information associated with the backup file may be correspondingly created or updated. Accordingly, the system may store first file information created for the first backup file within a first component of the global namespace. As described, the system may store portions of the file information based on the associated backup file being stored within a particular tier. Accordingly, the system may store a portion of the first file information within the first component, in response to determining portions of the file information for the backup files already stored within the nodes of the first storage performance tier are stored within the first component. For example, the system may first determine which branch of the namespace tree corresponds to the particular storage performance tier associated with the backup data, and in response, redirect storage of the portions of the file information to that particular component of the namespace tree.

As described, the system may store the portions of the first file information created for the first backup file within a global namespace. In some embodiments, the global namespace may be stored by a specialized node. In some embodiments, the system may store the received tier identifier as part of the first file information for the first backup file. In some embodiments, storing the received tier identifier as part of the first file information may be performed in response to receiving the received tier identifier as an input to an operation for initiating the clustered storage environment to store the backup data.

As described, the clustered storage environment may perform maintenance operations such as garbage collection to reclaim unused storage space. The garbage collection may be executed as part of a scheduled routine, or via user initiation. In either scenario, the system, in 604, may receive an indication to reclaim unused storage space (e.g. perform garbage collection) within the clustered storage environment. The indication may specify reclaiming unused storage space for a particular node (e.g. first node). In addition, the indication may specify a particular storage performance tier (e.g. first storage performance tier), or a set of nodes that form a storage performance tier. For example, when an indication specifies that garbage collection is to be performed for a particular storage performance tier, the system may perform garbage collection on each node within the tier independently and in parallel as further described.

In response, in 605, the system may identify the unused storage space associated with the backup files stored within the first node by accessing the storage allocation map stored by the first node. As described, the system identify the unused storage space within the first node independently. In order to identify the unused storage space, the system may access (or traverse) the storage allocation map. As described, because the system may group (or co-locate) the storage allocation map and the associated backup files, the system may identify the unused storage space associated with each node independently. For example, the system may be able to identify the unused storage space for at least the first node, or the set of nodes that form the first storage performance tier, independently by accessing only the corresponding storage allocation maps. For example, the first storage performance tier may include a first and second node, and accordingly, the system may identify unused storage space associated with the backup files stored within the first and second nodes independently and in parallel by accessing only the storage allocation maps of the first and second nodes. In some embodiments, the nodes themselves may reclaim the unused storage space without requiring access to external nodes (e.g. the specialized node) because the storage allocation map is stored internally on the node.

In 606, the system may reclaim the unused storage space associated with the first backup file, in response to identifying at least the first backup file is associated with the unused storage space. For example, the data blocks allocated to the first backup file may no longer be needed, and accordingly, the system may clear such data blocks for subsequent use. In addition, the system may update the first file information for the first backup file, in response to identifying at least the first backup file is associated with the unused storage space.

Accordingly, embodiments described herein may provide the ability reclaim unused storage space for each storage performance tier independently and efficiently.

Figure 7:
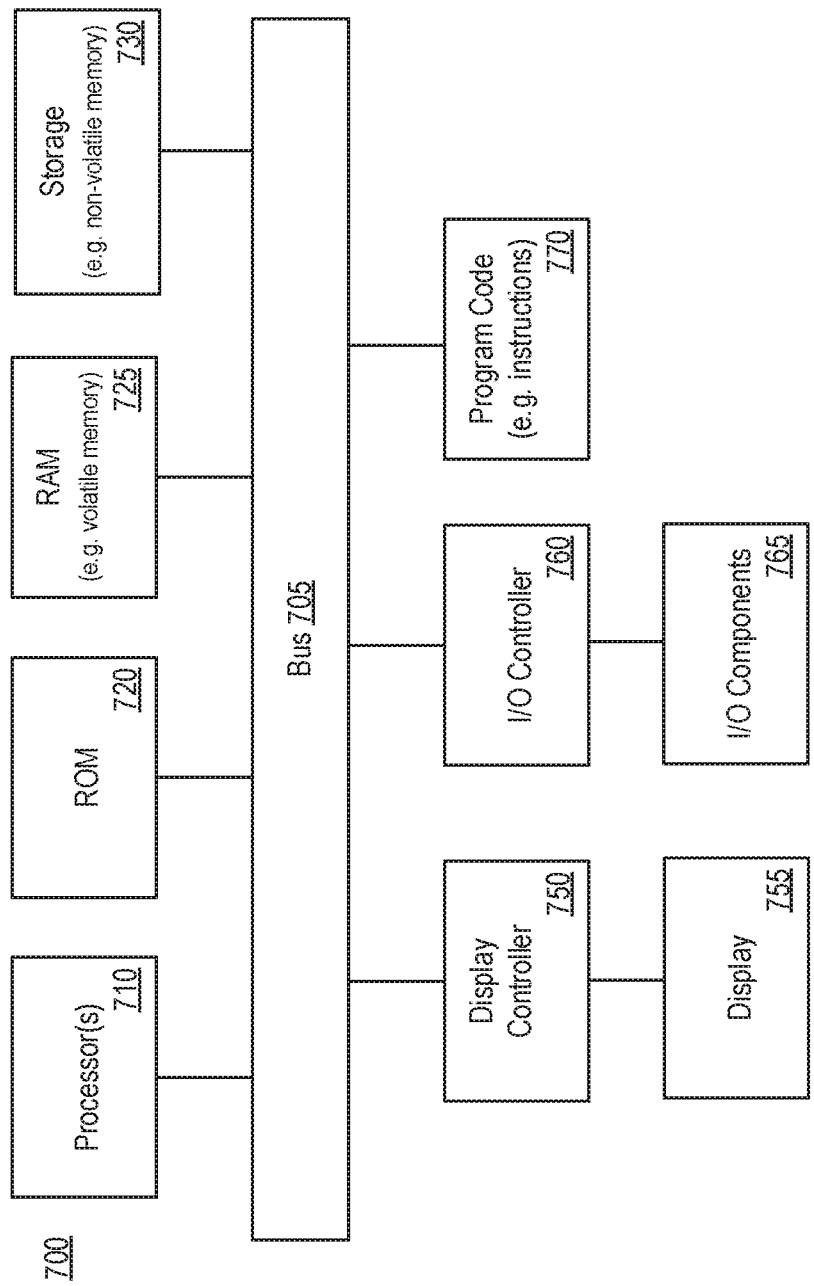
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. storage system 140, clustered storage environment 180, node 212, CWB 206, CSP 210, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. storage system 140, clustered storage environment 180, node 212, CWB 206, CSP 210, etc.). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
  one or more processors; and
  a non-transitory computer readable medium storing a plurality of instructions, which when executed, cause the one or more processors to:
  receive, at a clustered storage environment, backup data and a tier identifier associated with the backup data, the clustered storage environment including a set of nodes organized into a set of storage performance tiers, each of the nodes storing a storage allocation map for backup files stored by the node;
  store the backup data as part of a first backup file within a first node of a first storage performance tier, in response to determining the first storage performance tier is identified by the tier identifier;
  update the storage allocation map of the first node, in response to storing the backup data as part of the first backup file;
  receive an indication to reclaim unused storage space within the clustered storage environment, the indication specifying unused storage space only within the first storage performance tier;
  identify, for at least the first node independently, the unused storage space associated with the backup files stored within the first node by accessing the storage allocation map; and
  reclaim the unused storage space associated with the first backup file, in response to identifying at least the first backup file is associated with the unused storage space.

2. The system of claim 1, wherein the plurality of instructions, when executed, further cause the one or more processors to:
  store first file information created for the first backup file within a global namespace stored by a specialized node; and
  store the received tier identifier as part of the first file information for the first backup file.

3. The system of claim 2, wherein identifying the unused storage space within the first node by accessing the storage allocation map is performed without accessing the specialized node.

4. The system of claim 1, wherein the first storage performance tier includes the first node and a second node.

5. The system of claim 4, wherein the plurality of instructions, when executed, further cause the one or more processors to:
  identify, for at least the second node independently and in parallel with the first node, unused storage space associated with the backup files stored within the second node by accessing a storage allocation map of the second node.

6. The system of claim 1, wherein the file information for backup files stored within the nodes of each storage performance tier are stored as an independent component of the global namespace, the global namespace is represented as a B+ tree data structure, and the independent component of the global namespace includes a branch of the B+ tree.

7. The system of claim 1, wherein the set of storage performance tiers includes at least a storage performance tier storing deduplicated data, and a storage performance tier storing non-deduplicated data.

8. The system of claim 7, wherein storing the backup data as part of the first backup file within the first node of the first storage performance tier includes storing the backup data directly to the first backup file without performing a deduplication processing, in response to determining the storage performance tier storing non-deduplicated data is identified by the tier identifier as the first storage performance tier.

9. A method comprising:
  receiving, at a clustered storage environment, backup data and a tier identifier associated with the backup data, the clustered storage environment including a set of nodes organized into a set of storage performance tiers, each of the nodes storing a storage allocation map for backup files stored by the node;
  storing, by the clustered storage environment, the backup data as part of a first backup file within a first node of a first storage performance tier, in response to determining the first storage performance tier is identified by the tier identifier;
  updating the storage allocation map of the first node, in response to storing the backup data as part of the first backup file;
  receiving an indication to reclaim unused storage space within the clustered storage environment, the indication specifying unused storage space only within the first storage performance tier;
  identifying, for at least the first node independently, the unused storage space associated with the backup files stored within the first node by accessing the storage allocation map; and
  reclaiming the unused storage space associated with the first backup file, in response to identifying at least the first backup file is associated with the unused storage space.

10. The method of claim 9, further comprising:
  storing first file information created for the first backup file within a global namespace stored by a specialized node; and
  storing the received tier identifier as part of the first file information for the first backup file.

11. The method of claim 10, wherein identifying the unused storage space within the first node by accessing the storage allocation map is performed without accessing the specialized node.

12. The method of claim 9, wherein the first storage performance tier includes the first node and a second node.

13. The method of claim 12, further comprising:
identifying, for at least the second node independently and in parallel with the first node, unused storage space associated with the backup files stored within the second node by accessing a storage allocation map of the second node.

14. The method of claim 9, wherein the file information for backup files stored within the nodes of each storage performance tier are stored as an independent component of the global namespace, the global namespace is represented as a B+ tree data structure, and the independent component of the global namespace includes a branch of the B+ tree.

15. A computer program product comprising a non-transitory computer-readable medium having a computer-readable program code embodied therein to be executed by one or more processors, the program code including instructions to:
receive, at a clustered storage environment, backup data and a tier identifier associated with the backup data, the clustered storage environment including a set of nodes organized into a set of storage performance tiers, each of the nodes storing a storage allocation map for backup files stored by the node;
store the backup data as part of a first backup file within a first node of a first storage performance tier, in response to determining the first storage performance tier is identified by the tier identifier;
update the storage allocation map of the first node, in response to storing the backup data as part of the first backup file;
receive an indication to reclaim unused storage space within the clustered storage environment, the indication specifying reclaiming unused storage space only within the first storage performance tier;
identify, for at least the first node independently, the unused storage space associated with the backup files stored within the first node by accessing the storage allocation map; and
reclaim the unused storage space associated with the first backup file, in response to identifying at least the first backup file is associated with the unused storage space.

16. The computer program product of claim 15, wherein the program code includes further instructions to:
store first file information created for the first backup file within a global namespace stored by a specialized node; and
store the received tier identifier as part of the first file information for the first backup file.

17. The computer program product of claim 16, wherein identifying the unused storage space within the first node by accessing the storage allocation map is performed without accessing the specialized node.

18. The computer program product of claim 15, wherein the first storage performance tier includes the first node and a second node.

19. The computer program product of claim 18, wherein the program code includes further instructions to:
identify, for at least the second node independently and in parallel with the first node, unused storage space associated with the backup files stored within the second node by accessing a storage allocation map of the second node.

20. The computer program product of claim 15, wherein the file information for backup files stored within the nodes of each storage performance tier are stored as an independent component of the global namespace, the global namespace is represented as a B+ tree data structure, and the independent component of the global namespace includes a branch of the B+ tree.

* * * * *